United States Patent
Hoy et al.

(10) Patent No.: US 9,442,710 B2
(45) Date of Patent: Sep. 13, 2016

(54) METHOD FOR USING SHARED INSTALLATION SESSION ENVIRONMENT TO DUPLICATE INSTALLS

(71) Applicant: INTERNATIONAL BUSINESS MACHINES CORPORATION, Armonk, NY (US)

(72) Inventors: Jeffrey R. Hoy, Southern Pines, NC (US); Barry J. Pellas, Durham, NC (US); David M. Stecher, Seattle, WA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 282 days.

(21) Appl. No.: 14/141,846

(22) Filed: Dec. 27, 2013

(65) Prior Publication Data

US 2015/0186127 A1    Jul. 2, 2015

(51) Int. Cl.
*H04L 29/08* (2006.01)
*G06F 9/445* (2006.01)

(52) U.S. Cl.
CPC ............. *G06F 8/63* (2013.01); *H04L 67/34* (2013.01)

(58) Field of Classification Search
CPC ........... H04L 67/34; G06F 8/63; G06F 8/61; H04M 1/72525
See application file for complete search history.

(56) References Cited

U.S. PATENT DOCUMENTS

| | | | |
|---|---|---|---|
| 6,938,250 B2 | 8/2005 | Cohen et al. | |
| 2009/0271781 A1* | 10/2009 | Cui | G06F 8/61 717/173 |
| 2010/0083058 A1* | 4/2010 | Shufer | G06F 11/1433 714/49 |
| 2013/0007727 A1 | 1/2013 | Donatelli et al. | |

* cited by examiner

*Primary Examiner* — Kim T Nguyen
(74) *Attorney, Agent, or Firm* — Law Office of John Timar

(57) ABSTRACT

A method for utilizing a partial active installation session on a first computer system for an active installation session of a program product on a second computer system. Active installation of the program product having a plurality of components is initiated on the first computer system. A plurality of deployed components installed during the partial active installation session is duplicated. The deployed software components are archived into a new installation package. The new installation package is copied and deployed to the second computer system. Installation of the active product installation is completed on the second system.

14 Claims, 3 Drawing Sheets

METHOD FOR USING SHARED INSTALLATION SESSION ENVIRONMENT TO DUPLICATE INSTALLS

BACKGROUND

Embodiments of the invention generally relate to software builds on computer systems and, more particularly, to the shared installation of an installation environment on multiple computer platforms.

No methods are currently known to share information about a software installation or cloud deployment while a system is being deployed and before it finishes. Typically, users can perform an installation of software on one client computer platform, and when finished, copy the installation image to another client computer platform. A Zip installer utility can be used to install applications and utilities that do not provide an internal installation program. It can automatically extract all files from the Zip file, copy them to the destination folder, and create shortcuts in the start menu and on the desktop.

BRIEF SUMMARY

In one embodiment, a method is provided for utilizing a partial active installation session on a first computer system for an active installation session of a program product on a second computer system. Active installation of the program product having a plurality of components is initiated on the first computer system. A plurality of deployed components installed during the partial active installation session is duplicated. The deployed software components are archived into a new installation package. The new installation package is copied and deployed to the second computer system. Installation of the active product installation is completed on the second computer system.

BRIEF DESCRIPTION OF THE DRAWINGS

These and other advantages and aspects of the embodiments of the disclosure will become apparent and more readily appreciated from the following detailed description of the embodiments taken in conjunction with the accompanying drawings, as follows.

DETAILED DESCRIPTION

Figure 1:
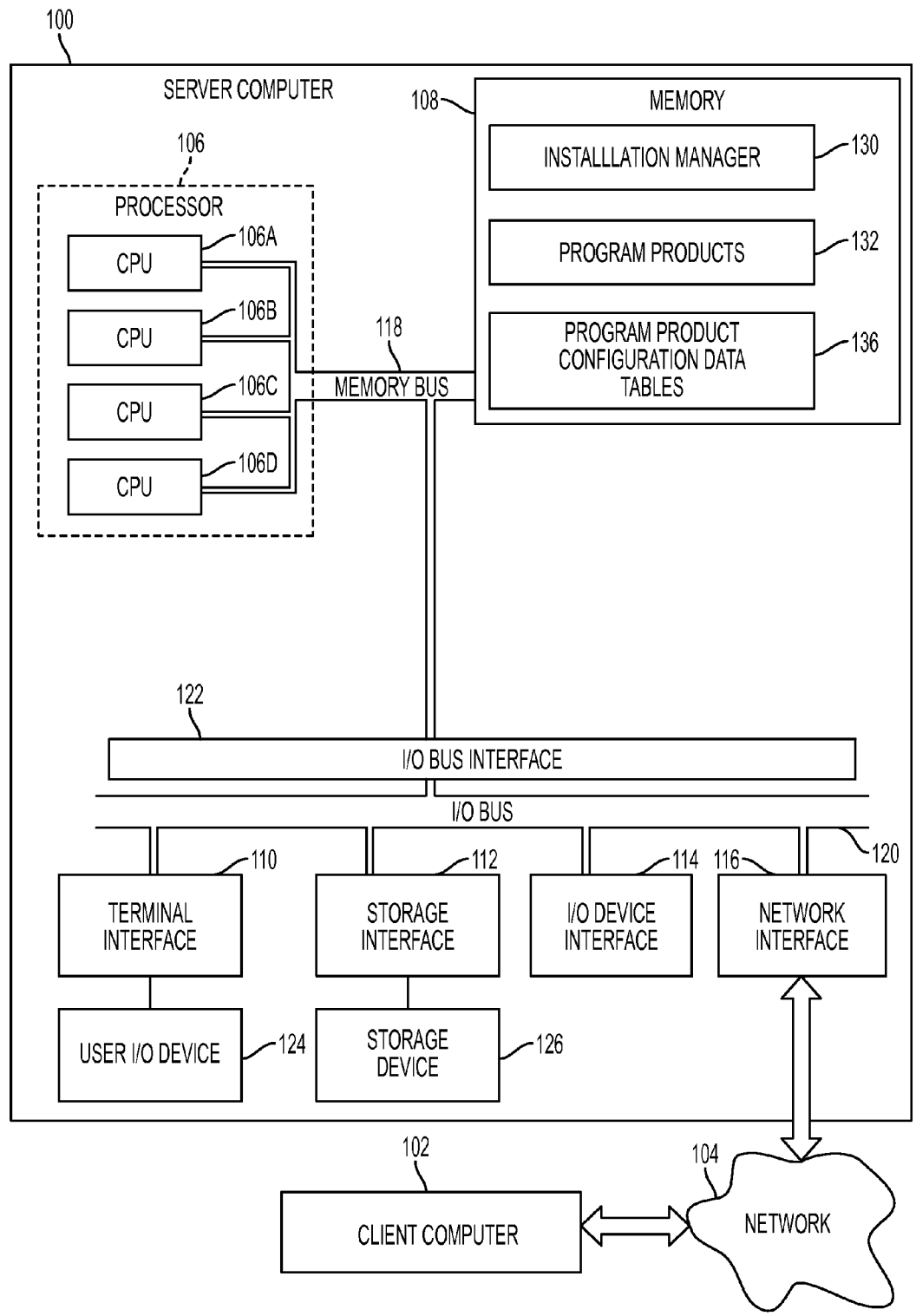
FIG. 1 illustrates an installation manager screen display in an exemplary embodiment.

The following description is provided as an enabling teaching of embodiments of the invention. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the invention and not in limitation thereof, since the scope of the invention is defined by the claims.

Under current software installation procedures, users can perform an installation of complex software, and when finished, copy the installation image to another location and localize it. There are times however when only parts of the localization steps are common. For example, in a new software deployment involving a plurality of distinct steps, the user may only want to do the first few steps, combined with another step, and then fork into a "new" instance of the installation to complete the remaining steps.

In one embodiment, the invention provides advantages over any current installation processes by saving one or more end users time by reusing, an installation from another user on the network. For example, consider an installation process requiring seven distinct steps. A first user would do an installation which is being monitored on the network. A second user then could come into the installation mechanism and be notified that the first user is on step 4 of the seven installation steps. The second user could take the installation "session" of the first user (snapshot) and customize it to his environment by completing, for example, only steps 5-7. This can provide a great ease in the deployment of many software systems. In the cloud, for example, software deployments are typically very similar and scripting packages are used to add or change functionality after the fact. Using this method, the user could customize the deployment and process for localization during deployment time.

In one embodiment, an ongoing, live installation "session" could be picked up and moved to another user's computer system. A live installation session is also referred to herein as an active installation session. The method also provides the user with the ability to enter form data during a live install and push it to another user's active installation, "session" along with the ability for any additional changes that the first user has made in future steps to be pushed to any children installation sessions and synchronized. The method provides the ability to take a "snapshot" of a live cloud deployment and move it to another computer system (also referred to as a machine herein) to finish the deployment. The method further provides the ability to take a snapshot of an active deployment and hand it off to another user, while retaining the ability to complete the first user's own independent installation.

Installation and configuration of computer program products on computer systems may take considerable amounts of time to complete. In some cases, program product installation and configuration may take several hours to complete. During this time the user may be idle while waiting for the program product to be installed. For example, a program product installation may require the user to wait until all installation and configuration processes are complete before doing any work with the actual program product.

In general, program product installations do not allow the user to configure the program product while the program product installation is taking place. The known solutions of product configuration include doing the configuration upfront before installation or doing the configuration work post-install. This is limiting because many times product installations may go on for hours and there may be no reason the user cannot make progress for the entire deployment while installation steps are proceeding. The embodiments described allow for program product configuration as the program product reaches one or more installation milestones.

FIG. 1 depicts a high-level block diagram representation of a server computer system 100 connected to a client computer system 102 via a network 104, according to an embodiment. The terms "server" and client are used herein for convenience only, and in various embodiments a computer system that operates as a client computer in one environment may operate as a server computer in another environment, and vice versa. The mechanisms and apparatus of embodiments apply equally to any appropriate computing system, including a computer system that does not employ the client-server model.

The major components of the computer system 100 may include one or more processors 106, a main memory 108, a terminal interface 110, a storage interface 112, an I/O (Input/Output) device interface 114, and a network interface 116, all of which may be coupled communicatively, directly or indirectly, for inter-component communication via a memory bus 118, an I/O bus 120, and an I/O bus interface unit 122.

The computer system 100 may contain one or more general-purpose programmable central processing units (CPUs) 106A, 106B, 106C and 106D, herein generically referred to as the processor 106. In an embodiment, the computer system 100 may contain multiple processors typical of a relatively large system; however, in another embodiment the computer system 100 may alternatively be a single CPU system. Each processor 106 may execute instructions stored in the main memory 108 and may include one or more levels of on-board cache.

In an embodiment, the main memory 108 may include a random-access semiconductor memory, storage device, or storage medium, (either volatile or non-volatile) for storing or encoding data and programs. In another embodiment, the main memory 108 may represent the entire virtual memory of the computer system 100, and may also include the virtual memory of other computer systems coupled to the computer system 100 or connected via the network 104. The main memory 108 may be conceptually a single monolithic entity, but in other embodiments the main memory 108 may be a more complex arrangement, such as a hierarchy of caches and other memory devices.

The main memory 108 may store or encode an installation manager 130, program products 132, and program product configuration tables 136. Although the installation manager 130, program products 132, and program configuration tables 136 are illustrated as being contained within the memory 108 in the computer system 100, in other embodiments some or all of them may foe on different computer systems and may foe accessed remotely, e.g., via the network 104. The computer system 100 may use virtual addressing mechanisms that allow the programs of the computer system 100 to behave as if they only have access to a large, single storage entity instead of access to multiple, smaller storage entities. Thus, while the installation manager 130, program products 132, and program product configuration, tables 136 are illustrated as being contained within the main memory 108, these elements are not necessarily completely contained in the same storage device at the same time. Furthermore, although the installation manager 130, program products 132, and program product configuration tables 136 are illustrated as being separate entities, in other embodiments some of them, portions of some of them, or all of them may be packaged together.

In an embodiment, the installation manager 130, program products 132, program product configuration tables 136 may include instructions or statements that execute on the processor 106 or instructions or statements that may be interpreted by instructions or statements that execute on the processor 106, to carry out the functions as further described below with reference to FIGS. 2-3. In another embodiment, the installation manager 130, program products 132, and program product configuration tables 136, or two or more of these elements may be implemented in hardware via semiconductor devices, chips, logical gates, circuits, circuit cards, other physical hardware devices, or a combination of these devices in lieu of, or in addition to, a processor-based system. In an embodiment, the installation manager 130, program products 132, and program product configuration tables 136, or two or more of these elements may include data in addition to instructions or statements.

The memory bus 118 may provide a data communication path for transferring data among the processor 106, the main memory 108, and the I/O bus interface 122. The I/O bus interlace 122 may be further coupled to the I/O bus 120 for transferring data to and from the various I/O units. The I/O bus interface unit 122 communicates with multiple I/O interface units 110, 112, 114 and 116, which may also be known as I/O processors (IOPs) or I/O adapters (IOAs), through the I/O bus 120.

The I/O interface units support communication with a variety of storage and I/O devices. For example, the terminal interface unit 110 supports the attachment, of one or more user I/O devices 124, which may include user output devices (such as a video display device, speaker or television set) and user input devices (such as a keyboard, mouse, keypad, touchpad, trackball, buttons, light pen, or other pointing device). A user may manipulate the user input devices utilizing a user interface, in order to provide input data and commands to the user I/O device 124 and the computer system 100, and may receive output data via the user output devices. For example, a user interface may be presented via the user I/O device 124, such as displayed on a display device, played via a speaker, or printed via a printer.

In one embodiment, the shared installations can be run in parallel with one installation responding to another installation while both are in progress. Multiple shared installations can communicate with each other during installation, and change the installation path/dialog accordingly based on what has happened in the sibling installation process.

Figure 2:
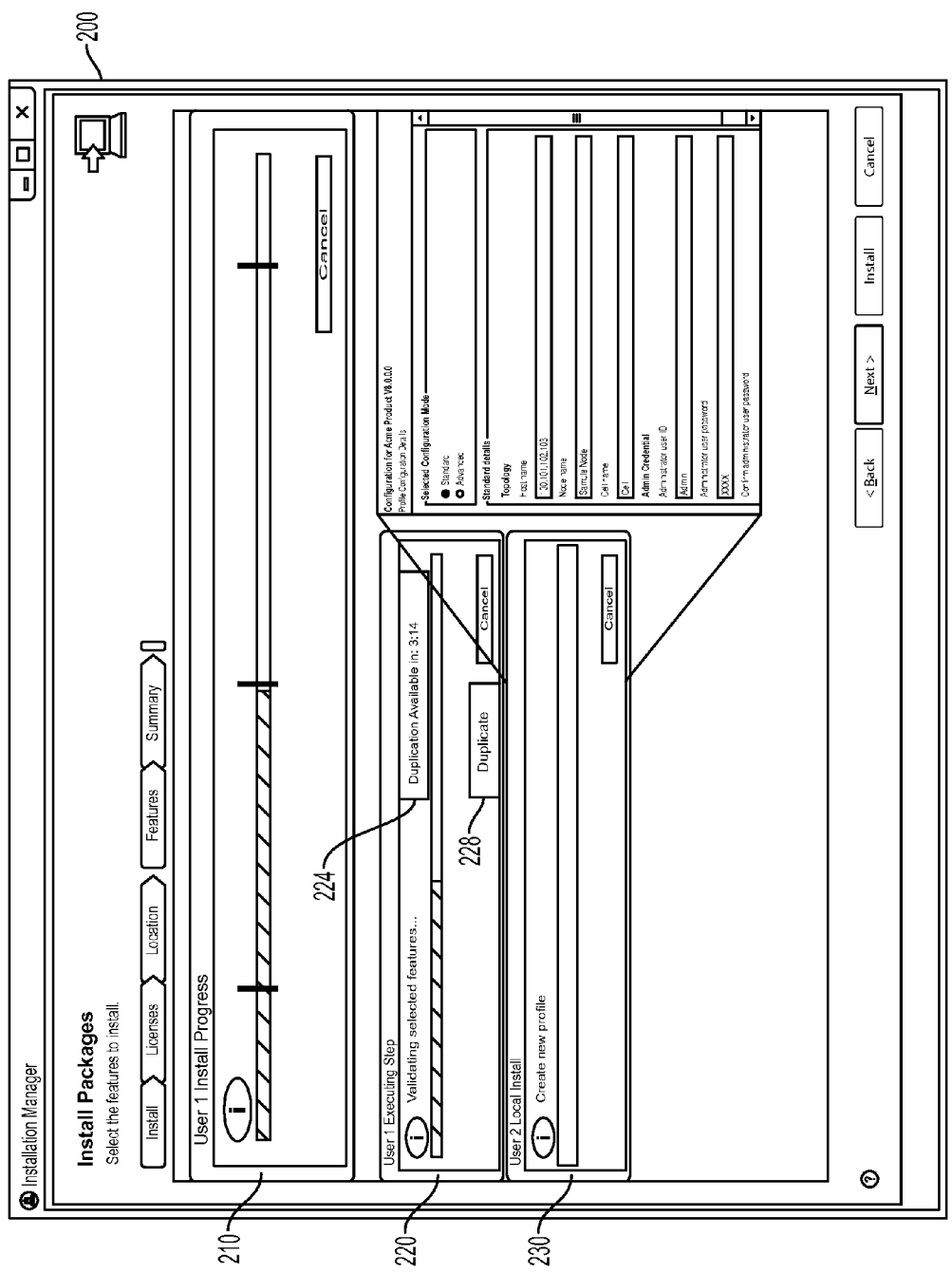
FIG. 2 illustrates an installation manager screen display in an exemplary embodiment.

FIG. 2 illustrates an installation manager screen display 200 in an exemplary embodiment. In the screen display 200, a first user is currently installing a product as shown in window 210 which includes an install progress bar having three milestones indicated by the vertical bars. The product installation could have specific checkpoints which could be taken as installation snapshots over the network when completed. This is indicated in window 210 with the install progress bar having three checkpoints indicated by the vertical bars. The first user has several steps to go after the first checkpoint is reached and a snapshot is taken. A simple example could be the installation of Microsoft Office by the first user. The first checkpoint can be completion of the installation of Microsoft Word; the second checkpoint the completion of installation of Microsoft PowerPoint; the third checkpoint the completion of installation of Microsoft Excel. The second user sees that the first user has completed about 50% of the installation process. The second user knows that he can see that most of the form data entered by the first user is applicable for his installation as well (at least as it relates to the installation process at this point in time). The second user knows that he needs to do some specific installation work for any future steps. The second user then notifies the network to copy and localize the first user's installation while the installation is still in progress by clicking on the "Duplicate" button 228. Alternatively, the first user can notify the network to copy and localize the installation while the installation is still in progress by clicking on the "Duplicate" button 228. Once the network copy has completed, the installation can be resumed on the new machine. The installation can be modified before resumption on the new machine, to allow for updated localization steps to be specified, or even the remaining portion of the installation to be replaced with an installer more relevant to the environment.

In one example, a user installing an IBM® WebSphere® Application Server on a Windows® machine could take a snapshot of the installation at a point before most, or all, of the Windows-specific updates take place. The installation snapshot could be copied to a Linux® machine, and the remainder of the installation routine replaced with the Linux version of the WebSphere Application Server installation program. Alternatively, the installation snapshot could be stored for later use, and the remainder of the installation routine could be replaced with a future version of the WebSphere Application Server installation program for Linux that includes better localization. In a further alternative, the installation snapshot could be copied to a Linux machine on a new Linux distribution, and custom localization provided to complete the installation on the new platform. In a still further alternative, the portions of localization could be mixed and matched. In each of these alternate cases, the user has the option to select which pieces have been completed, and to define how the remainder of the installation proceeds on another machine.

Figure 3:
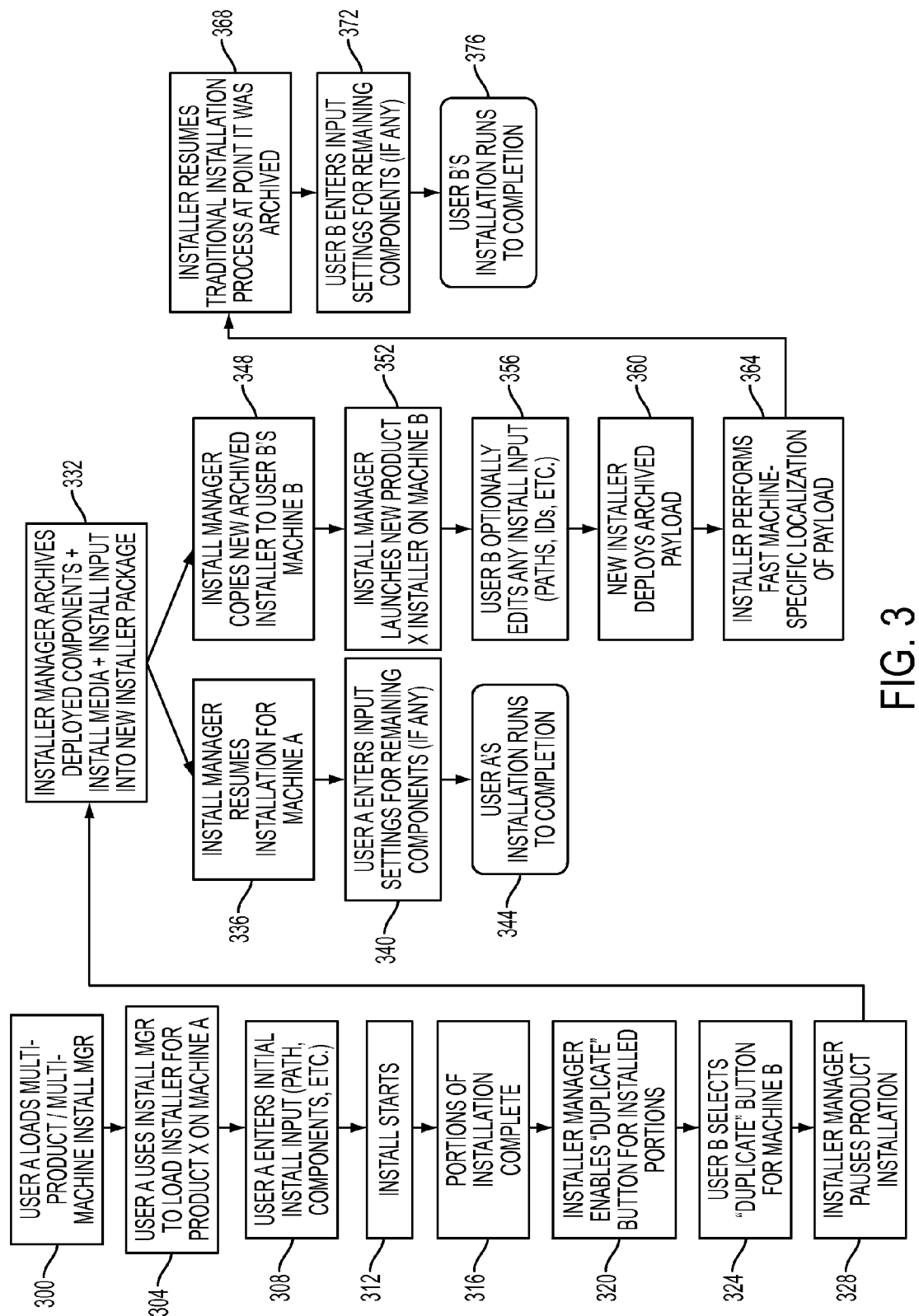
FIG. 3 illustrates processing logic for sharing an installation session environment to duplicate installation and configuration of program products on a second computer system.

FIG. 3 illustrates processing logic for sharing an installation session environment to duplicate installation and configuration of program products on a second computer system in one embodiment. Processing commences when User A loads the multi-product/multi-machine installation manager on his computer system (also referred to as Machine A) as indicated in logic block 300. User A uses the installation manager to load the software installer program for a particular software product (Product X) on his computer system (Machine A) as indicated in logic block 304. User A enters the initial install input including the install path and components as indicated in logic block 308. The install starts on User A's computer system as shown in block 312. Portions of the software installation complete on User A's computer system as indicated in block 316.

When a certain or predetermined portion of the software program has installed, the installer manage program enables the "Duplicate" button 228 (shown in FIG. 2) for the installed portions, as indicated in logic block 320. User B then selects the "Duplicate" button for User B's computer system (Machine B) as indicated in block 324. At this point in the process, the installer manager software pauses product installation on User A's computer system as shown in block 328. Next, the Installer Manager archives the deployed components and the install media and the install input into a new installer package, as shown in logic block 332. This archived installer package may also be referred to as a snapshot, an archive install or a Zip install, the latter name because the installation snapshot created is placed into a Zip file. When the new installer package is unzipped on Machine B, the deployed components (i.e., portions of Product X installed on the first computer system (Machine A)) will rapidly install on the new machine. The new installer package can be transmitted over a computer network connecting the first and second computer systems. The new installer package can also be saved to a memory device such as a Flash drive, CD-ROM or other suitable computer readable storage medium which can be utilized with the second computer system to deploy the package.

On the first computer system, the install manager resumes installation for User A as shown in block 336. User A then enters input settings for any remaining components as indicated in block 340. The installation on User A's computer system then runs to completion as shown in block 344.

In parallel with the resumption of installation on User A's computer system, the Install Manager copies the new archived installer to User B's computer system (also simply referred to as machine). This step is indicated in logic block 348. The Install Manager then launches the new Product X installer on User B's computer system as shown in block 352. Next, User B can optionally edit any input including install path, IDs, etc. as shown in block 356. Likewise, User B can keep the install path and IDs during product installation on Machine B. The new installer then deploys the archived payload as indicated in logic block 360. The installer then performs a fast machine-specific localization of the payload as indicated in block 364.

The installer resumes the traditional installation process at the point where it was archived as indicated in block 368. User B can enter input settings for any remaining components to be installed on the second computer system as indicated in block 372. The installation on User B's computer system then runs to completion as shown in block 376.

The above-described process builds a fully functional installer based in part on the snapshot. This enables the same snapshot installer to be used to install the product on many other machines. In an alternate embodiment, there can be a "Duplicate" button on User's B machine that would enable creating a snapshot of the installation on Machine B so that the new installer generated could perform a fast machine-specific localization of the payload in order to duplicate the new installation to Machine C.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly or the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow-chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiments are possible without departing from the scope of the present invention. In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the invention is defined solely by the appended claims.

What is claimed:

1. A method for utilizing a partial active installation session on a first computer system for an active installation session of a program product on a second computer system comprising:
    loading a multiple product, multiple computer system installation manager on the first computer system;
    initiating active installation of the program product having a plurality of components on the first computer system by the installation manager;
    pausing the active installation session on the first computer system by the installation manager when a deployment of the plurality of components on the first computer system progresses to a predetermined partial active installation checkpoint;
    duplicating the plurality of deployed components installed during the partial active installation session by the installation manager;
    archiving the plurality of deployed components into a new installation package by the installation manager;
    deploying the new installation package to the second computer system by the installation manager;
    resuming the active installation of the program product on the first computer system from the predetermined partial active installation checkpoint by the installation manager independently of the program product installation on the second computer system;
    completing installation of the program product on the second computer system in parallel with the resumed program product installation on the first computer system.

2. The method for utilizing a partial active installation session on a first computer system for an active installation session of a program product on a second computer system of claim 1 further comprising receiving installation changes from the first computer system subsequent to deploying the new installation package on the second computer system; and selectively applying the subsequent installation changes on the second computer system.

3. The method for utilizing a partial active installation session on a first computer system for an active installation session of a program product on a second computer system of claim 1 further comprising using a fast archive install for a partial installation deployment on the second computer system.

4. The method for utilizing a partial active installation session on a first computer system for an active installation session of a program product on a second computer system of claim 3 wherein a plurality of components that are installed after the fast archive install on the second computer system prompt a user for additional inputs for the components that are installed.

5. The method for utilizing a partial active installation session on a first computer system for an active installation session of a program product on a second computer system of claim 1 wherein archiving the plurality of deployed components into a new installation package by the installation manager comprises copying a product installer, the plurality of deployed components, an installation media, and a plurality of installation inputs into the new installation package.

6. A computer program product for utilizing a partial active installation session on a first computer system for an active installation session of a software product on a second computer system when executed on a computer processor, the computer program product comprising a non-transitory computer readable medium having embedded thereon:
program instructions that cause the processor to load a multiple product, multiple computer system installation manager on the first computer system;
program instructions that cause the processor to initiate active installation of the software product having a plurality of components on the first computer system;
program instructions that cause the processor to pause the installation of the software product on the first computer system when a deployment of the plurality of components progresses to a predetermined partial active installation checkpoint;
program instructions that cause the processor to duplicate a plurality of deployed components installed during the partial active installation session;
program instructions that cause the processor to archive the plurality of deployed components into a new installation package;
program instructions that cause the processor to deploy the new installation package to the second computer system;
program instructions that cause the processor to resume the software product installation on the first computer system from the predetermined partial active installation checkpoint independently of the software product installation on the second computer system; and
program instructions that cause the processor to complete installation of the software product on the second computer system in parallel with the resumed software product installation on the first computer system.

7. The computer program product for utilizing a partial active installation session on a first computer system of claim 6 the non-transitory computer readable medium further comprising program instructions that cause the processor to perform a fast archive install for a partial installation deployment on the second computer system.

8. The computer program product for utilizing a partial active installation session on a first computer system of claim 6 wherein the program instructions that cause the processor to archive the plurality of deployed components into the new installation package further comprise program instructions that cause the processor to copy a product installer, the plurality of deployed components, an installation media, and a plurality of installation inputs into the new installation package.

9. A system for utilizing a partial active installation session on a first computer system for an active installation session of a program product on a second computer system comprising:
a memory device for storing a plurality of software modules:
a processor for executing the plurality of software modules, including:
a module for loading a multiple product, multiple computer system installation manager on the first computer system;
a module included in the installation manager for initiating active installation of the program product having a plurality of components on the first computer system;
a module included in the installation manager for pausing the active installation session on the first computer system when a deployment of the plurality of components on the first computer system progresses to a predetermined partial active installation checkpoint;
a module included in the installation manager for duplicating a plurality of deployed components installed during the partial active installation session;
a module included in the installation manager for archiving the plurality of deployed software components into a new installation package;
a module included in the installation manager for deploying the new installation package to the second computer system;
a module included in the installation manager for resuming active program product installation on the first computer system from the predetermined partial active installation checkpoint independently of the program product installation on the second computer system; and
a module for completing installation of the program product on the second computer system in parallel with the resumed program product installation on the first computer system.

10. The system for utilizing a partial active installation session on a first computer system of claim 9 further comprising a module for performing a fast archive install for a partial installation deployment on the second computer system.

11. The system for utilizing a partial active installation session on a first computer system of claim 9 further comprising a module for receiving installation changes from the first computer system subsequent to deploying the new installation package on the second computer system; and selectively applying the subsequent installation changes on the second computer system.

12. The system for utilizing a partial active installation session on a first computer system of claim 9 further comprising a module for using a fast archive install for a partial installation deployment on the second computer system.

13. The system for utilizing a partial active installation session on a first computer system of claim 12 further comprising a module for prompting a user for additional inputs for the components installed on the second computer system by the fast archive install.

14. The system for utilizing a partial active installation session on a first computer system of claim 9 further comprising a module for copying a product installer, the plurality of deployed components, an installation media, and a plurality of installation inputs into the new installation package.

* * * * *